United States Patent [19]

Kinkade et al.

[11] 4,238,238

[45] Dec. 9, 1980

[54] CALCINING KETTLE HAVING MEANS FOR RETURNING STACK EXHAUST GAS TO CALCINING MIXTURE

[75] Inventors: William A. Kinkade, Lisle; Robert E. McCleary, Geneva, both of Ill.

[73] Assignee: United States Gypsum Company, Chicago, Ill.

[21] Appl. No.: 66,729

[22] Filed: Aug. 15, 1979

[51] Int. Cl.³ .............................................. C04B 11/00
[52] U.S. Cl. ..................... 106/110; 432/102; 432/151; 432/152
[58] Field of Search .................. 106/109, 110; 432/16, 432/102, 151, 152, 176, 177, 209

[56] References Cited

U.S. PATENT DOCUMENTS

| | | | |
|---|---|---|---|
| 622,327 | 4/1899 | Calvert | 432/209 |
| 3,378,246 | 4/1968 | Leding | 432/151 |
| 3,901,645 | 8/1975 | Rowland | 432/177 |
| 4,113,836 | 9/1978 | O'Connor | 423/171 |
| 4,161,390 | 7/1979 | Page et al. | 432/102 |

FOREIGN PATENT DOCUMENTS 1558080  2/1970  Fed. Rep. of Germany ........ 263/53 A Primary Examiner—John J. Gamby
Attorney, Agent, or Firm—Samuel Kurlandsky; Robert H. Robinson; Kenneth E. Roberts

[57] ABSTRACT

A calcining apparatus comprising a kettle, a heating chamber for heating the outside of the kettle, a stack for exhausting gas from the heating chamber, a duct connected at one end to the stack and having the other end extending for a limited distance into the contents of the reaction chamber of the kettle for introducing a portion of the stack gas directly into the calcining reaction mixture, and means for propelling the stack gas through the duct and into the reaction chamber of the kettle, thereby directly adding heat to the reaction mixture and accomplishing fuel conservation by recapturing and utilizing a portion of the heat from the stack gas.

11 Claims, 2 Drawing Figures

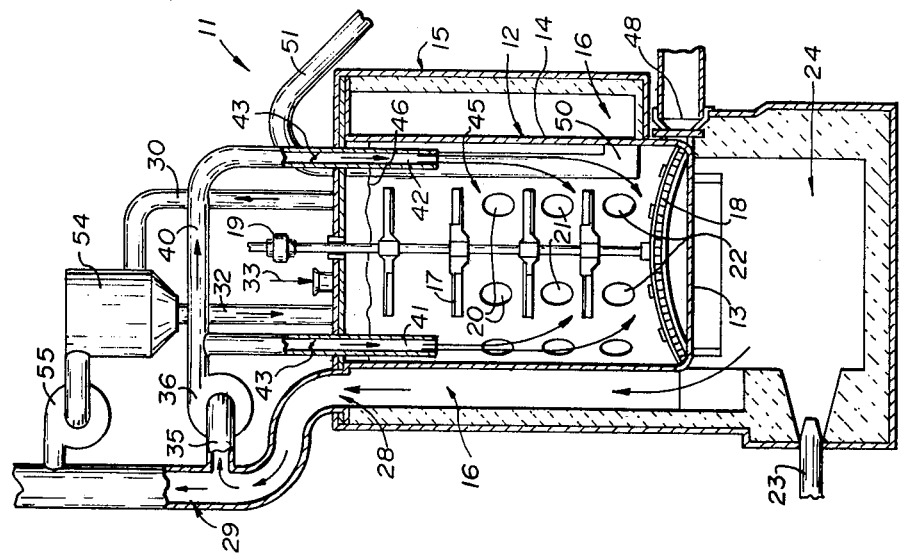

CALCINING KETTLE HAVING MEANS FOR RETURNING STACK EXHAUST GAS TO CALCINING MIXTURE

BACKGROUND OF THE INVENTION (1) Field of the Invention

The present invention relates to apparatus for calcining gypsum and similar materials, and more particularly refers to an apparatus in which fuel used to generate heat for the calcining process is more efficiently utilized.

(2) Description of the Prior Art

Gypsum calcination may be carried out in kettles and may be operated either continuously or batchwise.

In the process for calcining gypsum, gypsum in the form of calcium sulfate dihydrate is heated and converted to calcium sulfate hemi-hydrate, more commonly known as stucco or plaster. A large amount of heat is consumed in the calcining process. A portion of the heat is used to decompose the dihydrate crystals and transform them to the hemi-hydrate crystals. Additionally, a substantial amount of heat is utilized to drive off the water released in the calcining process. Various means are utilized for providing the necessary heat. In U.S. Pat. No. 3,901,645, a heating system is disclosed involving the use of flat flame burners for heating the bottom wall of the kettle, and additionally a luminous wall furnace for heating the side wall of the kettle. However, when the heating means is applied solely to the walls of the kettle, the process is not as efficient as would be desirable.

In U.S. Pat. No. 3,871,829, a horizontal calcining apparatus is shown also utilizing a gas flame for heating the horizontally disposed kettle. There again only the surface of the kettle imparts heat to the gypsum content being processed.

In U.S. Pat. No. 3,378,246, a vertical kettle type of calcining apparatus is disclosed utilizing a heating chamber through which hot gasses are passed for heating the kettle. However, here too, only the walls of the kettle transmit heat to the gypsum content inside also resulting in a somewhat decreased efficiency in terms of heat utilized.

In U.S. Pat. No. 3,236,509, a calcining kettle is shown in two versions. In one version a conventional heating chamber is used which surrounds the exterior of the kettle and all the heat is transferred to the calcination mixture by conduction through the kettle walls and through flues passing through the kettle chamber. Since the rate of conduction through the kettle is somewhat limited, a considerable amount of heat is lost in the discharged stack gases. A second version is shown in which the combustion gases are directly introduced into the chamber of the kettle and directly discharged into the reaction mixture. However, here too a good deal of the heat is wasted when the stack gases are discharged into the atmosphere at an elevated temperature.

In U.S. application Ser. No. 807,264, filed 6/16/77, now U.S. Pat. No. 4,161,390, a calcining kettle is disclosed which utilizes both heating of the exterior of the kettle and simultaneously introducing combustion gases generated by a separate burner directly into the reaction chamber of the kettle. However, here too a considerable portion of the heat energy escapes with the stack gases.

In German, Auslegeshcrift No. 1,558,080, published Feb. 12, 1970, a calcining kettle is disclosed having a conventional heating chamber for heating the bottom and sides of the kettle. Additionally, fresh air is drawn in from the atmosphere and passed through a heat exchanger which is heated by the stack gas. As a result, some of the heat from the stack gas is recovered. However, much of the stack gas heat is wasted, since the fresh air must first be heated from ambient temperature to a temperature at which the contents in the kettle are maintained, and this heat is lost to the calcining process.

SUMMARY OF THE INVENTION

It is therefore an object of the present invention to provide a calcining apparatus which can utilize fuel required for the calcining process more efficiently.

It is a further object to provide a calcining apparatus which can be fabricated at a cost not substantially higher than existing apparatus.

It is a further object to provide a calcining apparatus offering the advantages described above, which may be utilized in either a continuous or a batch-wise process.

These and other objects, advantages and functions of the invention will be apparent upon reference to the specification and to the attached drawing illustrating preferred embodiments of the invention, in which like parts are identified by like reference symbols in each of the views.

According to the invention, a calcining apparatus is provided which offers more efficient fuel and heat utilization, comprising a vertical calcining kettle having a heating chamber and a plurality of heating flues disposed within the kettle and communicating with the sections of the heating chamber, and a duct connected at one end to the stack through which the exhaust gases pass, the duct extending at its other end into the calcining mixture. Means such as a fan or blower is provided in the duct to blow the hot gases removed from the stack directly into the calcining mixture. Damper or other valve means may be provided in the stack or in the ducts to control the circulation of returned gas and to direct an optimum proportion of the stack gas back into the calcining mixture. As a result, a large part of the heat of the stack gas which normally would be vented to the atmosphere is returned and contributes heat to the calcining process, resulting in more efficient utilization of the fuel used to heat the calcining apparatus.

BRIEF DESCRIPTION OF THE DRAWINGS

FIG. 1 is a vertical sectional view of one embodiment of the invention, and

FIG. 2 is a vertical sectional view of another embodiment of the invention.

DESCRIPTION OF THE PREFERRED EMBODIMENTS

Referring to FIGS. 1 and 2 of the drawing, there is illustrated calcining apparatus 10 and 11 in two embodiments. Each apparatus comprises a kettle 12 having a bottom wall 13 and a side wall 14. A kettle jacket 15 is spaced apart from the side wall 14 and defines a hot gas chamber 16 therewith. The kettle is conventionally provided with a sweep 17 and drag 18 connected to a shaft 25, which in turn is connected by means of a coupling 19 to a motor drive (not shown). A plurality of hot air flues 20, 21 and 22 are connected to portions of the chamber 16. The basic structure is more specifically described in U.S. Pat. No. 4,161,390 issued July 17, 1979 for CALCINING KETTLE HAVING MULTI-PASS HEATING SYSTEM.

The present calcining apparatus shown in the views of the drawing further has an inlet port 33 for introducing uncalcined gypsum. The finished calcined gypsum is discharged through a riser 50 and an overflow duct 51. A stack 29 is connected through a discharge gate 28 to the heating chamber 16 and serves to conduct the exhaust gas which has passed around the kettle and through the flues to the atmosphere.

A dust collector 54 is connected to the exhaust from the kettle by an exhaust duct 30 and serves to remove gypsum dust from the exhaust gas and return the dust by means of a dust return duct 32 to the kettle, the gas passing through the dust collector being conducted to the stack through a blower 55.

Referring specifically to FIG. 1, the structure shown additionally has a stack gas return duct 35 connected to the stack 29 at one end and to a high temperature fan 36 at the other end. A gas discharge duct 38 is connected at one end to the outlet of the fan 36 and has its other end immersed into the calcining mixture 45 in the kettle through the upper level 46 of the mixture.

Referring specifically to FIG. 2, a modified embodiment of the apparatus shown in FIG. 1 is illustrated. Here, in addition to the structure described, a gas distribution duct 40 is connected at one end to the fan 36. A pair of gas discharge ducts 41 and 42 are connected to the gas distribution duct 40 and have their free ends immersed in the calcining reaction mixture. Apertures such as slots or holes may be provided near the ends of the gas discharge ducts 38, 41 and 42 to provide for lateral distribution of the recycled stack gases into the calcining reaction mixture. However, it has been found preferable to leave the sidewalls of the discharge walls unperforated.

In operation, combustible gases are burned in the firebox and the hot gases pass around the kettle and through the flues which pass through the kettle, and subsequently discharged into the stack which normally vents the gases to the atmosphere. However, in the present apparatus the fan 36 draws a major proportion of the combustion gases, almost 100%, from the stack through the stack gas return duct 35. The fan 36 forces the withdrawn gases into the gas discharge ducts 38, 41, and 42. Since the discharge ducts are submerged in the calcining reaction mixture and directed downwardly, the hot gases are forced directly into the mixture and operate to transfer the heat contained in the gases to the calcining reaction mixture.

In normal operation the temperature of the stack gas is about 750° F. while the temperature of the calcining reaction mixture is about 300° F. When the stack gas enters the reaction mixture it transfers its heat energy into the reaction mixture, dropping in temperature to about 300° F. This results in a material saving in fuel.

In operation the stack gas may be recycled in a percentage of from about less than 10% to almost 100%. It has been found that recycling about 95% of the stack gas provides optimum recovery of the stack gas heat. The percentage recycled should be controlled so that the temperature of the stack gas does not get too low. In practice temperature-sensitive devices such as thermocouples may be inserted in the stack to monitor the temperature. When the temperature goes below the desired value, or approaches the value of the calcining reaction temperature, dampers 39 or 43 or other devices may be utilized to limit somewhat the percentage of gas returned to the reaction mixture.

It has been found that when about 95% of the stack gas is recirculated, a savings of about 12–14% in fuel is accomplished. Alternatively, by utilizing the same amount of fuel, an output increase of about 12–14% may be accomplished in the same period of time.

In designing the present apparatus, wherein hot stack gas is recovered and recirculated into the contents of the calcining kettle, it is desirable to utilize equipment for the greatest economy. This can in part be accomplished by utilizing a single stage fan which is relatively inexpensive, compared to high pressure blowers, for recycling the stack gas. Fans which are commercially available are generally able to provide an air pressure measured in terms of 15–17 inches of water column pressure. As used herein in the specifications and claims in decribing the pressure of recirculated stack gas, the pressure is expressed in terms of the pressure applied at the bottom of a water column in terms of the height of the column in inches.

In order to carry out the present process properly, the end of the duct which introduces the recirculated stack gas into the contents of the kettle must be so positioned in relation to the upper surface of the kettle content that the recirculated gas adequately mixes with the kettle content to transfer the heat therefrom into the kettle contents. It has been found that the end of the discharge duct should be disposed substantially vertically downward through the upper surface of the calcining mixture so that the discharged gas is directed toward the bottom of the kettle to insure adequate mixing. However, the end of the discharge duct must not be submerged too deep, since then the pressure of the blown discharged gas may not be sufficiently great to overcome the pressure at the end of the duct produced by the weight of the kettle contents. It has been found that when utilizing a single stage fan which is able to produce a water column pressure of about 17 inches, adequate mixing may be obtained when the end of the discharge duct is positioned at least 15 inches of water column presure below the upper level of kettle content. However, in order that the pressure of the discharging gas can overcome the kettle contents pressure, the end of the duct should be maintained at a position below the upper level of the kettle content at which the pressure produced by the kettle content is less than 17 inches of water column pressure. Since the discharge duct is mounted in the kettle in fixed relationship thereto, proper operation may be obtained by raising or lowering the upper level of the kettle contents.

In order to determine when proper mixing of the discharging stack gas with the kettle contents is being obtained, a thermocouple or other temperature sensing device may be located in the exhaust stack through which the dust-laden atmosphere above the kettle is withdrawn. Conventionally the contents of the kettle are maintained during calcination at a temperature of about 295°–320° F. The recirculated stack gas discharged into the contents of the kettle initially has a temperature of about 750° F. Consequently, if the temperature-sensing device indicates that the exhaust gas from the kettle is greater than about 295°–320° F., this indicates that not all the heat available from the recirculated stack gas has been transferred to the kettle contents. Consequently, the level of the content is raised until adequate mixing is obtained. However, the level should not be raised so far that the pressure within the discharge duct is not as great as the pressure resulting from the weight of the kettle contents as applied to the open end of the duct.

If the level of the discharge duct must be lowered a substantial amount, it may be necessary to use a more powerful and more expensive gas moving device such as a high pressure blower. Since one of the objects of the invention is to accomplish the utilization of heat from the stack gas at the lowest cost in apparatus, it is desirable to utilize the least expensive gas moving means such as a single stage fan and adjusting the level of the discharge duct below the upper level of the kettle content to a point where the low cost fan is still able to drive the gas into the contents while still obtaining adequate mixing to utilize the maximum amount of recirculated heat.

In the preferred form of the invention the discharge tube, except for the opening at the end thereof, should have sidewalls which are free of openings and completely closed. The presence of apertures or perforations as sometimes utilized in prior art equipment may result in the gas introduced being discharged laterally and not downwardly. This may result in poor mixing. However, by positioning the discharge duct at a greater depth, to the extent permitted by the fan or blower, adequate mixing may still be obtained.

It has been further found that by maintaining the discharge duct in a position in which it is substantially vertically downwardly directed, and extending through the surface of the kettle contents, better mixing with the kettle contents may be obtained at low pressure than when the duct is mounted at the side or bottom and introduced laterally, or upwardly with respect to the kettle contents.

The calcining apparatus according to the invention has many advantages over those disclosed in the prior art. It may be utilized with any type of calcining kettle known in the art which utilizes combustion gases for heating the kettle. Second, the apparatus results in a very substantial savings in fuel, or, alternatively, in a higher output per unit of time for the same kettle. Existing kettles may be converted to the present apparatus by relatively simple conversion comprising providing a duct from the stack back to the interior of the kettle, with a high temperature fan or blower inserted in the duct. The apparatus has an advantage over the prior art apparatus described above which utilizes the stack gases to heat incoming ambient air, since the ambient air must first be heated to the temperature of the reaction mixture before it can in any way add heat to the mixture. This results in a considerable loss of heat from the stack gases.

It is to be understood that the invention is not to be limited to the exact details of construction or operation or materials shown and described, as obvious modifications and equivalents will be apparent to one skilled in the art.

Invention is claimed as follows:

1. A calcining apparatus, comprising:
   (a) a calcining kettle having side and bottom walls of heat conductive material defining a calcining chamber adapted to contain a calcining mixture,
   (b) means defining a heating chamber surrounding the walls of said kettle,
   (c) means for generating and introducing hot combustion gas into said heating chamber,
   (d) stack means comprising a duct connected to said heating chamber for exhausting said hot combustion gas and venting said gas into the atmosphere, and
   (e) means for removing a portion of the hot combustion gas which passes into the duct of said stack means and introducing said gas into a calcining mixture which is contained in said kettle, comprising:
      (1) a stack gas return duct having one end operatively connected to the duct of said stack means and the other end mounted in relationship to said kettle and adapted to discharge the gas removed from said stack means into said kettle at a level below the upper surface of the calcining mixture contained in said kettle when in operation, and
      (2) gas-moving means operatively connected to said stack gas return duct for driving the hot combustion gas removed from said stack means through said return duct and discharging said gas into the interior of said kettle,
   whereby hot combustion gas passing through said stack means may be removed therefrom and recirculated directly into the calcining reaction mixture contained in said kettle during operation of said calcining apparatus.

2. A calcining apparatus according to claim 1, wherein said return duct terminates in a discharge duct having a discharge port at its end, said discharge duct extending downwardly through the top of said kettle and adapted to have said discharge port positioned below the upper surface of said calcining mixture when said calcining apparatus is in operation.

3. A calcining apparatus according to claim 2, wherein the side wall of said discharge duct is free of perforations.

4. A calcining apparatus according to claim 2, wherein said gas moving means is a fan.

5. A calcining apparatus according to claim 3, wherein said fan is a single stage fan.

6. A calcining apparatus according to claim 3, wherein said fan is a multi-stage fan.

7. A calcining apparatus according to claim 2, wherein said gas-moving means is a blower.

8. A calcining apparatus according to claim 2, wherein said discharge duct is so positioned that when said kettle is filled with a calcining mixture, the discharge port is positioned at a sufficient distance below the upper surface of the calcining mixture to provide transfer of the heat from said stack to the calcining mixture, but is maintained at a distance below said upper surface where the pressure at said discharge port generated by the weight of said calcining mixture at said level is less than the pressure generated by said blowing means.

9. A calcining apparatus according to claim 5, wherein said fan is capable of providing a blowing pressure equivalent to the pressure of a water column of about 17 inches, and the discharge port is positioned at a distance below the upper surface of said calcining mixture so that the pressure applied by the weight of said calcining mixture at said port is equivalent to the pressure of a water column having a height in the range of from about 14 to less than 17 inches.

10. A calcining apparatus according to claim 1, wherein said heating chamber has a plurality of flues connected thereto extending through said kettle and adapted to conduct hot combustion gas between portions of said heating chamber.

11. A method for calcining calcium sulfate dihydrate to produce calcium sulfate hemi-hydrate, which comprises heating said calcium sulfate dihydrate in a calcining mixture contained in a calcining kettle by passing heated combustion gas around said kettle and not in direct contact with the calcining mixture, removing the hot combustion gas from the combustion chamber surrounding said kettle, and recirculating a substantial proportion of the combustion gas removed thereby and discharging said combustion gas directly into the calcining mixture at a distance below the surface of said calcining mixture sufficient to enable adequate heat transfer to the calcining mixture, but at a level whereby the pressure exerted by the weight of said calcining mixture is less than that of the pressure at which the gas is discharged into the calcining mixture.

* * * * *